US008553728B2

(12) United States Patent
Tu et al.

(10) Patent No.: US 8,553,728 B2
(45) Date of Patent: Oct. 8, 2013

(54) METHODS AND APPARATUS FOR ROBUST SLOTTED MODE OPERATION IN FADING WIRELESS ENVIRONMENTS

(75) Inventors: Alex Kuang-Hsuan Tu, San Diego, CA (US); Robbin D. Hughes, San Diego, CA (US); Rotem Cooper, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 138 days.

(21) Appl. No.: 12/248,761

(22) Filed: Oct. 9, 2008

(65) Prior Publication Data

US 2010/0091643 A1 Apr. 15, 2010

(51) Int. Cl.
*H04B 3/10* (2006.01)

(52) U.S. Cl.
USPC .......................................................... 370/491

(58) Field of Classification Search
None
See application file for complete search history.

(56) References Cited

U.S. PATENT DOCUMENTS

| 6,021,122 | A * | 2/2000 | Tiedemann, Jr. ............ 370/331 |
| 6,421,540 | B1 * | 7/2002 | Gilhousen et al. ............ 455/458 |
| 6,711,144 | B1 * | 3/2004 | Kim et al. .................. 370/335 |
| 6,904,282 | B2 | 6/2005 | Cooper |
| 7,215,956 | B2 | 5/2007 | Liu et al. |
| 2003/0003934 | A1 * | 1/2003 | Garces et al. ................ 455/517 |
| 2005/0083871 | A1 * | 4/2005 | Welnick et al. .............. 370/328 |
| 2006/0104236 | A1 * | 5/2006 | Cho ............................. 370/328 |
| 2008/0056214 | A1 * | 3/2008 | Low et al. ................... 370/338 |
| 2008/0186892 | A1 * | 8/2008 | Damnjanovic .............. 370/311 |
| 2010/0014484 | A1 * | 1/2010 | Sudo et al. .................. 370/331 |

FOREIGN PATENT DOCUMENTS

GB 2136179 9/1984

OTHER PUBLICATIONS

International Search Report—PCT/US2009/060234, International Search Authority—European Patent Office—Feb. 5, 2010.
Written Opinion—PCT/US2009/060234—ISA/EPO—Feb. 5, 2010.
3rd Generation Partnership Project; "Technical Specification Group Radio Access Network; Evolved Universal Terrestrial Radio Access (E-UTRA); Requirements for support of radio resource management" 3GPP TS 36.133 V8.3.0 (Release 8), pp. 1-59 (Sep. 2008).
Taiwan Search Report—TW098134403—TIPO—Oct. 11, 2012.

* cited by examiner

*Primary Examiner* — Fan Ng
(74) *Attorney, Agent, or Firm* — Kevin T. Cheatham

(57) ABSTRACT

Methods, devices and computer program products are disclosed that allow for wireless communication devices to operate more robustly in the slotted mode of operation in the event of network system loss. Specifically, present aspects require the wireless device to move to or remain in the slotted mode of operation as opposed to immediately entering into a system determination/acquisition mode upon failing to acquire an active set pilot during a slotted wake-up. By moving to the slotted mode of operation or providing for additional slotted-wake-ups, a number of attempts at acquiring the active set pilot can be performed before declaring the system as lost, thereby allowing for fading channel conditions to prevail without the need to re-acquire the lost system or otherwise acquire another system. Since the performance of the slotted mode is less power intensive than acquiring or re-acquiring a system, a substantial power savings is realized.

35 Claims, 8 Drawing Sheets

METHODS AND APPARATUS FOR ROBUST SLOTTED MODE OPERATION IN FADING WIRELESS ENVIRONMENTS

BACKGROUND

1. Field

The disclosed aspects relate to wireless communication networks, and more particularly, to systems, methods and apparatus for providing wireless communication devices' robust slotted mode operation in fading wireless environments.

2. Background

Wireless communication devices, such as cellular telephones, portable computers and the like, have rapidly gained in popularity over the past decade. These devices are increasingly becoming multifaceted devices capable of providing a wide-range of functions. For example, today's cellular telephone may also embody computing capabilities, Internet access, electronic mail, text messaging, GPS mapping, digital photographic capability, an audio/MP3 player, video gaming capabilities, video broadcast reception capabilities and the like.

The multifaceted nature of wireless communication devices results in the devices being used more frequently and, thus, more power is consumed. Wireless communication devices are conventionally powered by a battery. The longer the battery stays charged, the longer the user is able to utilize the wireless communication device without having to connect it to a recharger or otherwise replace the battery. While technological strides are being made to increase the power afforded to wireless device batteries and conserve the use of battery power so as to increase the performance time of the device, the need continues to exist to make further improvements in this area.

When a wireless communication device is switched on but not actively engaged in communicating user data, it typically operates in an idle mode. However, the term "idle mode" is somewhat of a misnomer because while the wireless communication device resides in the idle mode, the device performs various tasks that enable it to be ready for use, either to initiate or receive a call. Specifically, while in the idle mode the wireless communication device is constantly turning components and applications on and off; on to perform vital functions and off again to conserve battery power.

The tasks that the wireless communication must perform while in idle mode are often specified by the standards within which the wireless communication is to operate. These mandatory tasks are rather power consuming because they involve the radio receiver.

Included within the mandatory tasks is the ability of the wireless communication device to wake periodically and turn on its radio receiver briefly to see if it has been paged, which means to find out if there is an incoming call (mobile termination call) or a message. This periodic waking occurs on what is known as a slot cycle of a slotted mode. The purpose of the slot cycle is to permit the phone to keep the receiver turned off most of the time as a means of conserving battery life. When the wireless communication device first registers with a base station, the base station and device determine which paging channel the device will use (if there is more than one) and what phase of the slot cycle that mobile will use. Thereafter, the phone wakes periodically, turns its receiver on briefly to see if it has an incoming call or if there is other traffic from the cell it must respond to, and if there is nothing then it shuts the receiver down again and waits until the next slot time.

When an incoming call arrives at a base station for a given wireless communication device, the phone system of the caller generates the sound of a phone ringing as a comfort tone back to the caller, and the base station waits until the slot time for the called wireless communication device. When the slot occurs, the cell sends a message to the wireless communication device telling it that there is an incoming call. This causes the device to waken and set up the call, and to begin to ring. If the device doesn't respond to the page, the cell may try again on the next slot. The advantage of a longer slot cycle is that the device spends a lower percentage of the time with its receiver on and thus the battery will last longer. It also means there is more capacity on the paging channel. The advantage of a shorter slot cycle is that the device gets more chances to receive the page, and will receive the page sooner.

When the wireless communication device operates in the slotted mode, the device first, upon entering a slotted mode wake-up, attempts to acquire the active set pilot of the current system or cell that it is in communication with before it can decode the paging channel. If the wireless communication device fails to acquire the active set pilot during the slot, the device declares the system as being lost and enters into the system determination state, otherwise referred to as the system acquisition state. The system determination state provides for re-acquiring the system that has been lost or acquiring another system/cell. However, as appreciated by those skilled in the art, re-acquiring or acquiring a system is power intensive operation that requires the receiver to remain operative for an extended period of time to tune to the proper frequency and such.

Field studies have shown that when a wireless communication system is lost by the wireless communication device, in a high percentage of instances the device will re-acquire the same system back that was lost within a relatively short period of time. This is generally believed to be due to the wireless communication device determining a short fade, in which the signal strength deteriorates (i.e., fades) below an acceptable level for a short period of time before it strengthens to an acceptable level. Thus, if the wireless device is configured to re-acquire the system each time the device encounters a short fade during a slot wake-up, unnecessary battery power is consumed.

Therefore a need exists to improve the robustness of slotted mode operation to improve wireless communication device power consumption and, thus, improve standby time performance. In particular a need exists to improve slotted mode operation performance in instances in which the wireless communication device is determining fading or otherwise spotty coverage conditions.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Present aspects provide systems, methods, device and computer program products that allow for wireless communication devices to operate more robustly in the slotted mode of operation. Specifically, present aspects require the wireless device to enter into or otherwise remain in the slotted mode for an extended period under fading channel conditions as opposed to immediately entering into a system determination/acquisition mode upon experiencing a network system loss during any operational state or otherwise failing to acquire an active set pilot during a slotted wake-up. By entering or remaining in the slotted mode for an extended period, present aspects provide for performing slotted wake-ups after determining a network system loss and prior to declaring the network system as being lost, which means the device attempts to acquire the same or a different system/cell. By providing for slotted mode operation before declaring the system as lost, it allows for the device to operate in fading channel conditions without the need to re-acquire the lost system or otherwise acquire another system. Since the performance of slotted mode operation is less power intensive than acquiring or re-acquiring a system, a substantial power savings is realized. Additionally, an added benefit is that a higher probability of receiving a page on the paging channel exists during slotted mode operation then would be realized by requiring re-acquisition or acquisition of the same or another system.

In one aspect, a method is defined for initiating slotted mode operation of a wireless communication device. The method includes determining the occurrence a network system loss event and providing for slotted mode operation upon determining the network system loss event. The method further includes providing for a system acquisition state only if the slotted mode operation fails to acquire an active set pilot from the network system. The system acquisition state may provide for either attempting to re-acquire the current network system or attempting to acquire a new network system different from the current network system.

In one aspect of the method, determining the occurrence of the network system loss event is further defined as determining the failure to acquire the active pilot set during an initial slotted mode wake-up. In such aspects, providing for slotted mode operation is further defined as providing for one or more additional slotted mode wake-ups, wherein each additional slotted mode wake-up attempts to acquire the active set pilot of the network system. In addition, in such aspects providing for a system acquisition state further includes providing for a system acquisition state only if the one or more additional slotted mode wake-ups fail to acquire the active set pilot.

In other aspects of the method determining the occurrence of the network system loss event further defines the network system loss event as an access state network system loss event, a connected state network system loss event, an acquisition state network system loss event, an idle-non-slotted state network system loss event or any other operation state in which a network system loss may occur.

In one aspect of the method providing for slotted mode operation further includes providing for a predetermined number of slotted mode wake-ups, wherein each additional slotted mode wake-up attempts to acquire the active set pilot of the network system. In other related aspects of the method providing for slotted mode operation further includes providing for providing for a predetermined time period for the slotted mode operation during which the active pilot set is attempted to be acquired.

In certain aspects of the method, entering into slotted mode operation prior to entering system acquisition state may be predicated on various conditions being met. For example in one aspect the method may include determining one or more parameters related to current system signal strength prior to providing for slotted mode operation and/or determining historical system loss data associated with the current system loss. In such aspects, the method may include bypassing the slotted mode operation and providing for the system acquisition state after determining the network system loss event if the one or more parameters indicate a network system loss level of current signal strength or if the history of system loss indicates a need to acquire a new system.

At least one processor configured to provide for slotted mode operation of a wireless communication device provides for another related aspect. The processor includes a first module for determining the occurrence a network system loss event and a second module for providing for slotted mode operation upon determining the network system loss event. The processor additionally includes a third module for providing for a system acquisition state only if the slotted mode operation fails to acquire an active set pilot from the network system.

A further related aspect is provided for by a computer program product that includes a computer-readable medium. The medium includes a first set of codes for causing a computer to determine the occurrence a network system loss event and a second set of codes for causing the computer to provide for slotted mode operation upon determining the network system loss event. The medium also includes a third set of codes for causing the computer to provide for a system acquisition state only if the slotted mode operation fails to acquire an active set pilot from the network system.

An apparatus defines another related aspect of the innovation. The apparatus includes means for determining the occurrence a network system loss event and means for providing for slotted mode operation upon determining the network system loss event. The apparatus also includes means for providing for a system acquisition state only if the slotted mode operation fails to acquire an active set pilot from the network system.

Yet another aspect is provided for by a wireless communication device. The device includes a computer platform including a processor and a memory in communication with the processor. The device also includes a slotted mode module stored in the memory and in communication with the processor. The slotted mode module is operable to provide for slotted mode operation based on an occurrence of a network system loss event. The device additionally includes a system acquisition module stored in the memory and in communication with the processor. The system acquisition module is operable to attempt to acquire the network system only if the slotted mode operation fails to acquire the active set pilot from the network system.

In one aspect of the device, the slotted mode module may be further operable to determine the failure to acquire the active pilot set during an initial slotted mode wake-up. In such aspects, the slotted mode module may be further operable to provide for one or more additional slotted mode wake-ups, wherein each additional slotted mode wake-up attempts to acquire the active set pilot of the network system. Additionally, in such aspects, the slotted mode module may be further operable to provide for the system acquisition state only if the one or more additional slotted mode wake-ups fail to acquire the active set pilot.

In other described aspects of the wireless communication device, the slotted mode module is further operable to provide for slotted mode operation based on an occurrence of an access state network system loss event, a connected state network system loss event, an acquisition state network system loss event, an idle-non-slotted state network system loss event or the like.

In certain aspects of the wireless communication device, the slotted mode module is further operable to provide for a predetermined number of slotted mode wake-ups based on the occurrence of the network system loss event, wherein each additional slotted mode wake-up attempts to acquire the active set pilot of the network system. In other related aspects, the slotted mode module is further operable to provide for a predetermined time period for the slotted mode operation during which the active pilot set is attempted to be acquired.

In other aspects the wireless communication device may include a signal strength monitoring module stored in the memory and in communication with the processor. The signal strength monitoring module is operable to monitor current signal strength. In such aspects, the slotted mode module may be further operable to bypass the additional slotted mode wake-ups and the system acquisition module may be further operable to attempt to acquire a system after the determination of a system loss, if the signal strength monitoring module indicates an acceptable level of current signal strength.

In another aspect the wireless communication device may include a history of system loss database stored in the memory and in communication with the processor, wherein the database is operable to store parameters related to system loss. In such aspects the slotted mode module may be further operable to bypass the additional slotted mode wake-ups and the system acquisition module may be operable to attempt to acquire the system after the initial slotted mode wake up fails to acquire the active set pilot, if the history of system loss indicates a need to acquire a system.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote the elements, and in which.

DETAILED DESCRIPTION

Figure 1:
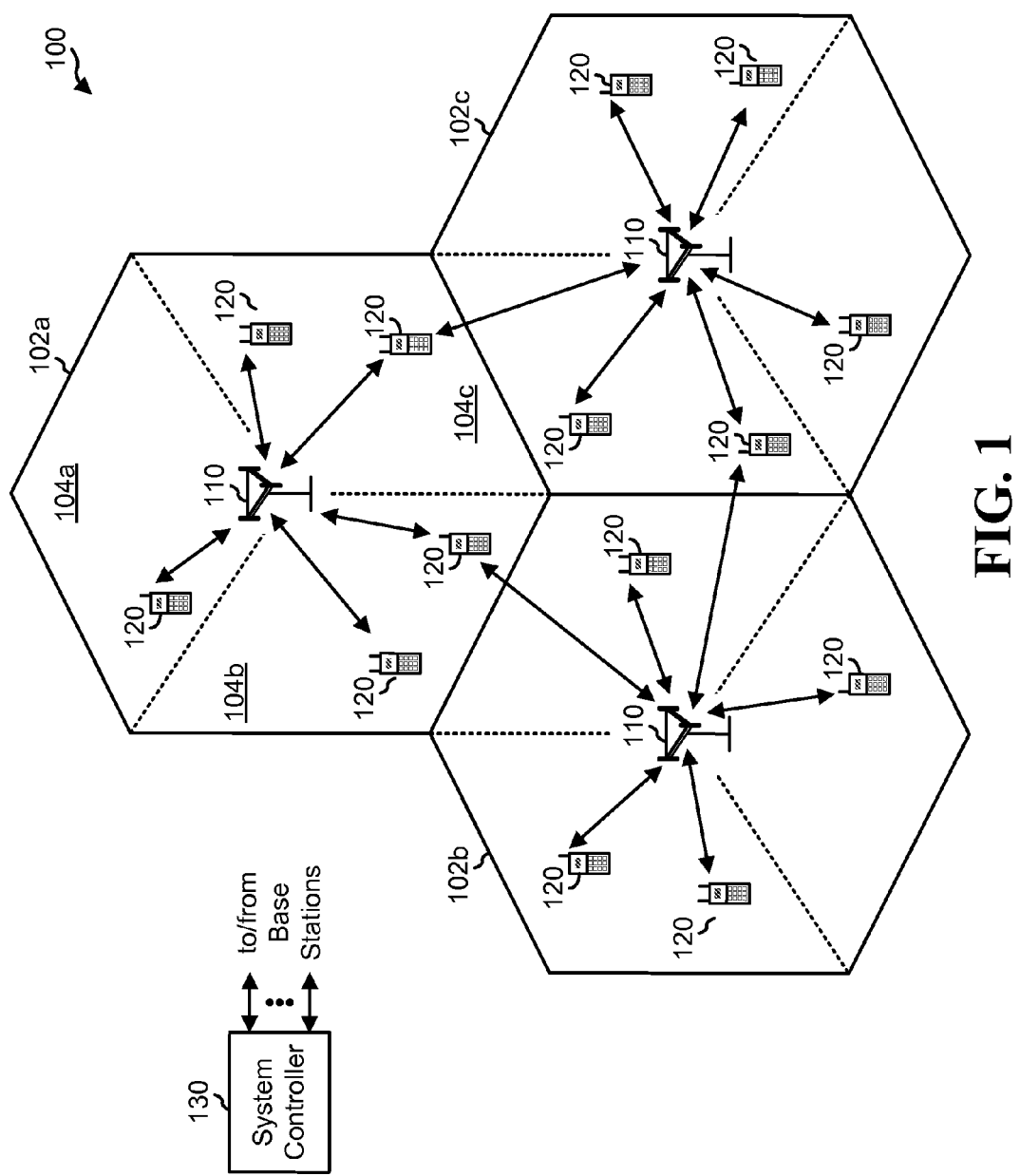
FIG. 1 is a schematic diagram of an exemplary wireless communication system, in accordance with present aspects.

Various aspects are now described with reference to the drawings. In the following description, for purposes of explanation, numerous specific details are set forth in order to provide a thorough understanding of one or more aspects. It may be evident; however, that such aspect(s) may be practiced without these specific details.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM□, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Referring now to the drawings, FIG. 1 illustrates a wireless communication system 100 with multiple base stations 110 and multiple wireless communication devices 120, such as can be utilized in conjunction with one or more aspects. A base station (110) is generally a fixed station that communicates with the terminals and can also be called an access point, a Node B, or some other terminology. Each base station 110 provides communication coverage for a particular geographic area or coverage area, illustrated as three geographic areas in FIG. 1, labeled 102a, 102b, and 102c. The term "cell" can refer to a base station and/or its coverage area depending on the context in which the term is used. To improve system capacity, a base station geographic area/coverage area can be partitioned into multiple smaller areas (e.g., three smaller areas, according to cell 102a in FIG. 1), 104a, 104b, and 104c. Each smaller area (104a, 104b, 104c) can be served by a respective base transceiver subsystem (BTS). The term "sector" can refer to a BTS and/or its coverage area depending on the context in which the term is used. For a sectorized cell, the BTSs for all sectors of that cell are typically co-located within the base station for the cell. The slotted mode techniques described herein can be implemented for a system with sectorized cells as well as a system with un-sectorized cells. Thus, the term "acquiring a system" or "re-acquiring a system" may refer to acquiring/re-acquiring a cell, a sectorized cell or the like.

Wireless communication devices 120 are typically dispersed throughout the system, and each device 120 can be fixed or mobile. Wireless communication devices 120 can also be called a mobile terminal, mobile station, user equipment, a user device, or some other terminology. A wireless communication device 120 can be a cellular phone, smart phones, laptops, handheld communication devices, handheld computing devices, satellite radios, global positioning systems, PDAs, and/or any other suitable device for communicating over wireless system 100. Each wireless communication device 120 can communicate with zero, one, or multiple base stations 110 on the downlink and uplink at any given moment. The downlink (or forward link) refers to the communication link from the base stations to the terminals, and the uplink (or reverse link) refers to the communication link from the terminals to the base stations.

For a centralized architecture, a system controller 130 couples to base stations 110 and provides coordination and control for base stations 110. For a distributed architecture, base stations 110 can communicate with one another as needed. Data transmission on the forward link often occurs from one access point to one access terminal at or near the maximum data rate that can be supported by the forward link and/or the communication system. Additional channels of the forward link (e.g., control channel) can be transmitted from multiple access points to one access terminal. Reverse link data communication can occur from one access terminal to one or more access points.

Figure 2:
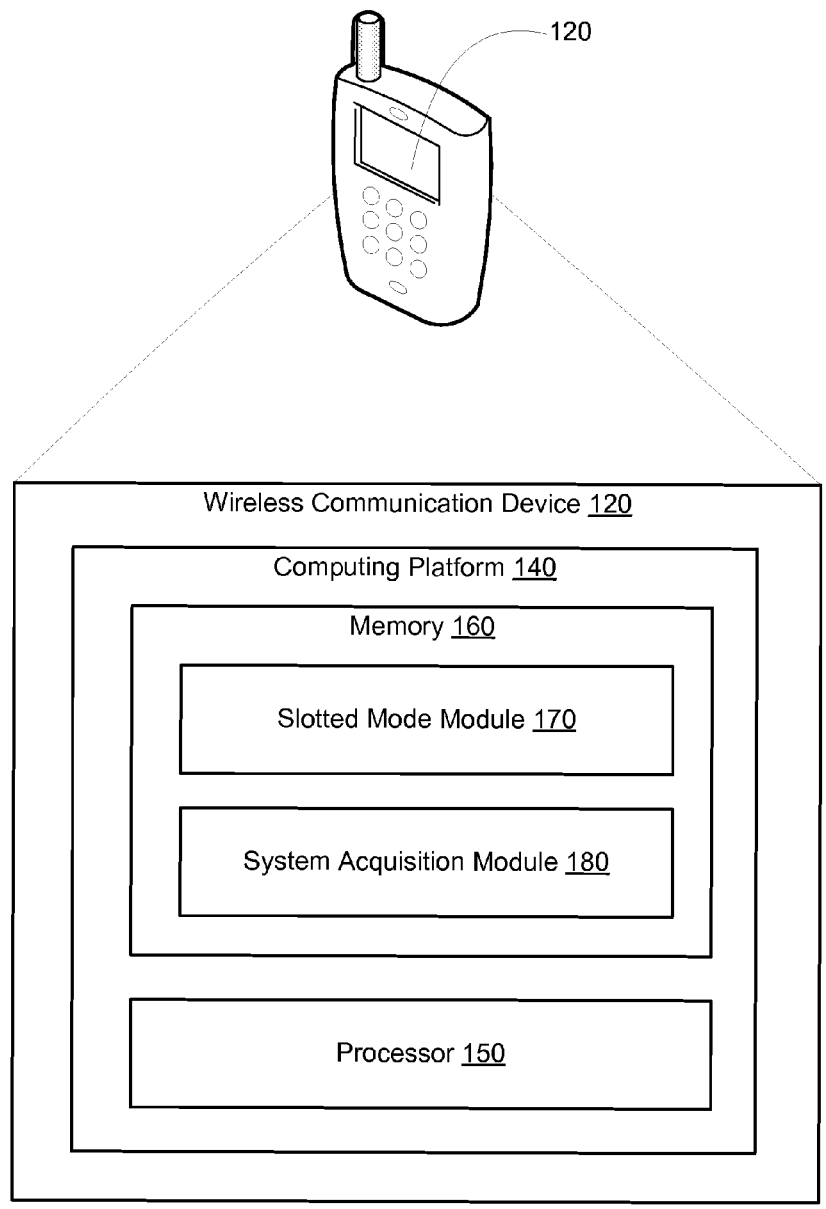
FIG. 2 is a block diagram of a wireless communication device configured to provide improved slotted mode operation, in according with present aspects.

Referring to FIG. 2 a block diagram is presented of a wireless communication device 120 configured for improved slotted mode operation, according to present aspects. Wireless communication device 120 includes a computer platform 140 having a processor 150 and a memory 160. Memory 160 includes slotted mode module 170 that is operable to provide for slotted mode operation based on the occurrence of a network system loss event. The network system loss event may occur during slotted mode operation, idle-non-slotted mode operation, access mode operation, acquisition mode operation connected mode operation or the like. For example, in slotted mode operation, if the initial slotted wake-up fails to acquire an active set pilot, one or more additional slotted wake-ups may be configured for the purpose of attempting to acquire an active set pilot as opposed to first attempting system acquisition or re-acquisition. In other examples, such as when network system loss is experienced during access mode operation, acquisition mode operation, connected mode operation or the like, the network system loss prompts the slotted mode module 170 to begin slotted mode operation as opposed to first attempting system acquisition or system re-acquisition.

Memory 160 also includes system acquisition module 180 that is operable to attempt to acquire a network system; either re-acquiring the same system that the device previously communicated with or acquire a new system. In accordance with present aspects, system acquisition module 180 is only invoked after the predetermined duration of the slotted mode operation fails to acquire the active set pilot. In this regard, after the system loss event the system acquisition module is not invoked but rather the device waits until one or more slotted wake-ups occur and, if no active set pilot is acquired during these slotted wake-ups, then the system acquisition module is invoked in an attempt to acquire a system.

By waiting to invoke the system acquisition module, present aspects result in a more robust slotted mode operation that significantly reduces battery power consumption and thus increases standby-time performance. This is because the system acquisition process, which requires the wireless device receiver (not shown in FIG. 2) to be functioning for a relatively long period, is a much more power intensive process than the slotted mode operation. Additionally, in most instances in which the wireless device loses the network connection it is due to the fact that the wireless device is currently residing in a fading channel environment. Field tests have shown that in most instances if a system acquisition operation is conducted after the network system connection is lost, the acquisition process generally re-acquires the same system; thus, confirming the belief that the device was in a fading environment when the network system connection was lost. Moreover, further field tests have shown that if slotted mode operation is implemented prior to invoking a system acquisition operation, one if the slotted mode operation will result in acquisition of the active set pilot; once again, confirming the belief that the device was in a fading environment when the network system connection loss occurred.

Figure 3:
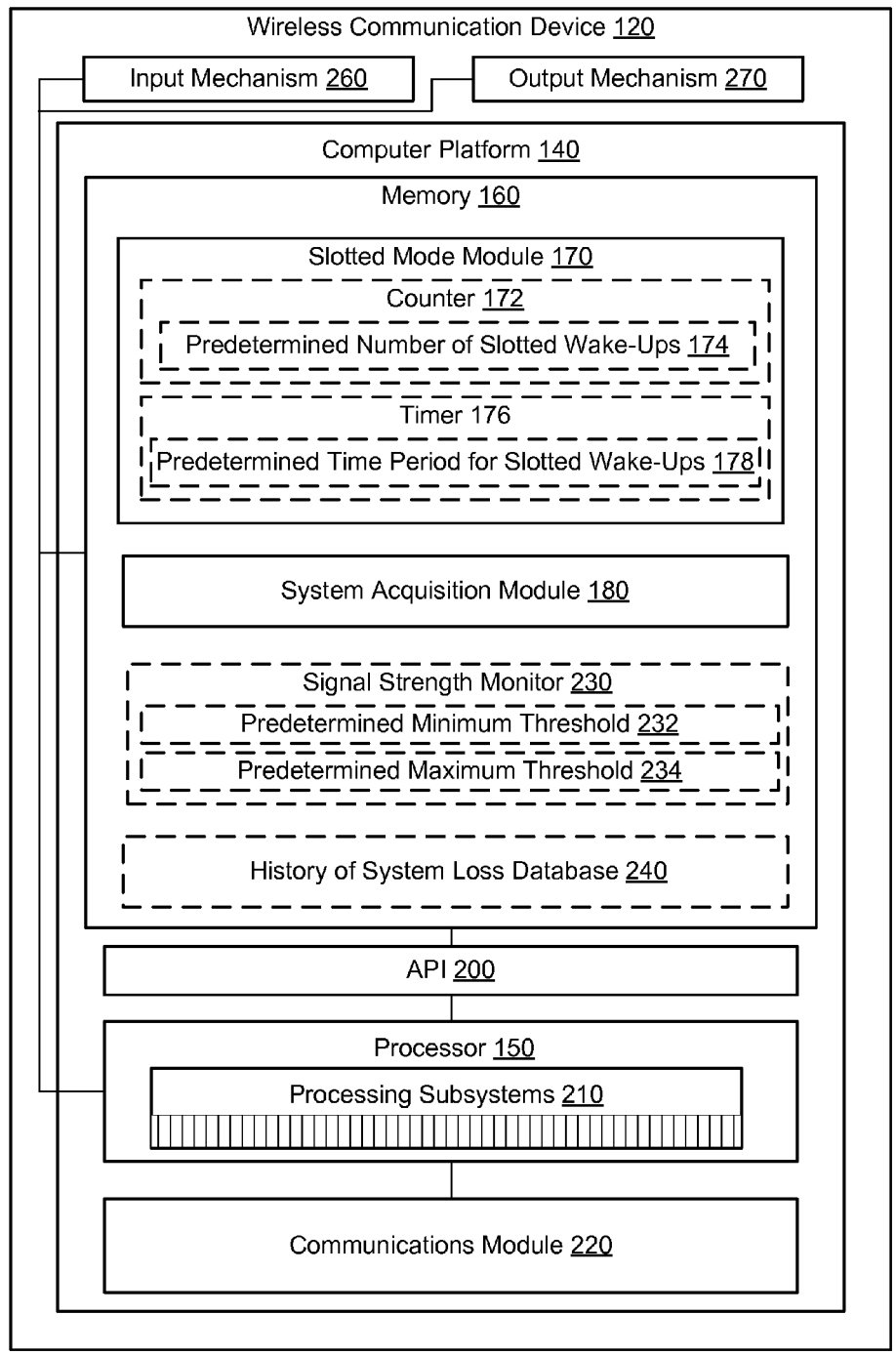
FIG. 3 is a detailed block diagram of the wireless communication configured to provide improved slotted mode operation, according to an aspect.

Referring to FIG. 3, depicted is a more detailed block diagram of a wireless communication device 120 having improved slotted mode operation, in accordance with present aspects. In addition to providing greater detail, FIG. 3 highlights various alternate aspects. The wireless communication device 120 may include any type of computerized, communication device, such as cellular telephone, Personal Digital Assistant (PDA), two-way text pager, portable computer, and even a separate computer platform that has a wireless communications portal, and which also may have a wired connection to a network or the Internet. The wireless communication device can be a remote-slave, or other device that does not have an end-user thereof but simply communicates data across the wireless network, such as remote sensors, diagnostic tools, data relays, and the like. The present apparatus and methods can accordingly be performed on any form of wireless communication device or wireless computer module, including a wireless communication portal, including without limitation, wireless modems, PCMCIA cards, access terminals, desktop computers or any combination or sub-combination thereof.

The wireless communication device 120 includes computer platform 140 that can transmit data across a wireless network, and that can receive and execute routines and applications. Computer platform 140 includes memory 160, which may comprise volatile and nonvolatile memory such as read-only and/or random-access memory (RAM and ROM), EPROM, EEPROM, flash cards, or any memory common to computer platforms. Further, memory 160 may include one or more flash memory cells, or may be any secondary or tertiary storage device, such as magnetic media, optical media, tape, or soft or hard disk.

Further, computer platform 140 also includes processor 150, which may be an application-specific integrated circuit ("ASIC"), or other chipset, processor, logic circuit, or other data processing device. Processor 150 or other processor such as ASIC may execute an application programming interface ("API") layer 200 that interfaces with any resident programs, slotted mode module 170 and system acquisition module 180 stored in the memory 160 of the wireless device 120. API 200 is typically a runtime environment executing on the respective wireless device. One such runtime environment is Binary Runtime Environment for Wireless® (BREW®) software developed by Qualcomm, Inc., of San Diego, Calif. Other runtime environments may be utilized that, for example, operate to control the execution of applications on wireless computing devices.

Processor 150 includes various processing subsystems 210 embodied in hardware, firmware, software, and combinations thereof, that enable the functionality of communication device 120 and the operability of the communication device on a wireless network. For example, processing subsystems 210 allow for initiating and maintaining communications, and exchanging data, with other networked devices. In aspects in which the communication device is defined as a cellular telephone the communications processor 150 may additionally include one or a combination of processing subsystems 210, such as: sound, non-volatile memory, file system, transmit, receive, searcher, layer 1, layer 2, layer 3, main control, remote procedure, handset, power management, digital signal processor, messaging, call manager, Bluetooth® system, Bluetooth® LPOS, position engine, user interface, sleep, data services, security, authentication, USIM/SIM, voice services, graphics, USB, multimedia such as MPEG, GPRS, etc (all of which are not individually depicted in FIG. 3 for the sake of clarity). For the disclosed aspects, processing subsystems 210 of processor 150 may include a counter, a timer or any other subsystem used in conjunction the slotted mode module 170 and/or the system acquisition module.

Computer platform 140 additionally includes communications module 220 embodied in hardware, firmware, software, and combinations thereof, that enables communications among the various components of the wireless communication device 120, as well as between the wireless device 120 and wireless network. In described aspects, the communication module 220 enables the communication of all correspondence between wireless communication device 120 and other wired or wireless devices. Thus, communication module 220 may include the requisite hardware, firmware, software and/or combinations thereof for establishing a wireless network communication connection. In some aspects, the communication module is operable for receiving messages, such as call messages or the like, received on the paging channel.

The memory 160 of computer platform 140 includes slotted mode module 170 that is operable to provide for slotted mode operation based on the occurrence of a network system loss event. As previously noted, the network system loss event may occur during any mode of operation, such as slotted mode operation, idle-non-slotted mode operation, access mode operation, acquisition mode operation, connection mode operation or the like. In slotted mode operation, the system loss event may occur during an initial slotted mode wake-up (otherwise referred to as a "slot") and, if the initial slotted wake-up fails to acquire an active set pilot, the slotted mode module 170 may be configured to provide for one or more additional slotted mode wake-ups during which an active set pilot is attempted to be acquired prior to implementing a system acquisition process. In other aspects, in which the system loss is acknowledged in other operation modes other than the slotted mode, such as idle-non-slotted mode, access mode, acquisition mode, connection mode or the like, determination of network system loss provides for the slotted mode of operation to implement in attempt to acquire the active set pilot prior to implementing system acquisition processing.

Memory 160 additionally includes system acquisition module 180 operable to acquire a network system for the wireless device 120. In accordance with present aspects, the system acquisition module is only invoked to acquire a system once the duration of the slotted mode of operation has failed to acquire the active set pilot.

In one aspect, slotted mode module 170 implements counter 172 that is operable to count a predetermined number 174 of slotted wake-up cycles during which the active set pilot is attempted to be acquired. As such, the system acquisition module 180 is only invoked after all of the predetermined number 174 of slotted-wake-ups have occurred. By way of example only, the predetermined number of slotted wake-up cycles may be defined as a number between one and ten and, more specifically two to five additional slotted wake-ups. Further discussion of aspects implementing a counter are described in relation to the flow diagram of FIG. 4, infra.

In another aspect, slotted mode module 170 may implement a timer 176 that is operable to account for a predetermined time period 178 for slotted wake-up cycles during which the active set pilot is attempted to be acquired. As such, any number of slotted wake cycles may be provided for, as long as the predetermined time period 178 has yet to expire. In this regard, the system acquisition module 180 is only invoked after the predetermined time period 178 has expired. The system acquisition module 180 may be configured to be invoked immediately after the network system loss time period has expired, assuming the device is not concurrently in the last of the additional slotted wake-up cycles, in which case the system acquisition module 180 would be invoked at the completion of the slotted wake-up. In alternate aspects, the system acquisition module may be configured to be invoked after the slotted mode module 170 attempts to wait for another slotted wake-up. By way of example only, the network system loss time period for additional slotted wake-ups may be between approximately 5 seconds and approximately 20 seconds Further discussion of aspects implementing a timer are described in relation to the flow diagram of FIG. 5, infra.

In alternate aspects, the wireless device 120 may be configured such that the need to conduct slotted-wakes is bypassed in lieu of immediately proceeding with a system acquisition attempt. This is because the device may be able to assess that device is currently not in a fading channel environment, historical data related to system loss may indicate the need to immediately provide for system acquisition processing or any other factor related to system acquisition processing and/or slotted mode operation.

Thus, in one alternate aspect, memory 160 may optionally include a signal strength monitoring module 230 operable to monitor the current signal strength. In such aspect, the slotted mode module 170 may bypass the slotted mode operation or the need for additional slotted wake-up cycles if the current signal strength is below a network system loss minimum threshold 232, which would indicate that the signal strength is below a level indicative of a fading environment, or above a network system loss maximum threshold 234, which would indicate that the signal is above a level indicative of a fading environment. When operating below the network system loss minimum threshold 232, slotted mode operation or additional slotted wake-up cycles would likely not result in an acquisition of the active set pilot because the device is outside of the fading region. When operating above the network system loss threshold 234, slotted mode operation or additional slotted wake-up cycles would likely not result in an acquisition of the active set pilot because the failure to acquire the active set pilot is not related to signal strength (i.e., some other factor or condition attributed to the failure to acquire the active set pilot).

In another alternate aspect, memory 160 may include a history of system loss database 240 that is operable to store parameters and/or conditions related to previous system loss events. For example, the history of system loss database may identify certain geographic areas or zones in which, although the device may or may not be in a fading environment, in which attempts to acquire the active set pilot would likely be futile. If the wireless device is currently located in one of the identified geographic areas or zones, the slotted mode module 170 may bypass slotted mode operation or additional slotted wake-up cycles and proceed to system acquisition processing. In addition, other historical data related to previous system losses may be relied upon in determining whether to proceed with slotted mode operation or to bypass slotted mode operation and proceed with system acquisition processing.

Thus, in one alternate aspect, memory 160 may optionally include a signal strength monitoring module 230 operable to monitor the current signal strength. In such aspect, the slotted mode module 170 may bypass the slotted mode operation or the need for additional slotted wake-up cycles if the current signal strength is below a network system loss minimum threshold 232, which would indicate that the signal strength is below a level indicative of a fading environment, or above a network system loss maximum threshold 234, which would indicate that the signal is above a level indicative of a fading environment. When operating below the network system loss minimum threshold 232, slotted mode operation or additional slotted wake-up cycles would likely not result in an acquisition of the active set pilot because the device is outside of the fading region. When operating above the network system loss threshold 234, slotted mode operation or additional slotted wake-up cycles would likely not result in an acquisition of the active set pilot because the failure to acquire the active set pilot is not related to signal strength (i.e., some other factor or condition attributed to the failure to acquire the active set pilot).

In another alternate aspect, memory 160 may include a history of system loss database 240 that is operable to store parameters and/or conditions related to previous system loss events. For example, the history of system loss database may identify certain geographic areas or zones in which, although the device may or may not be in a fading environment, in which attempts to acquire the active set pilot would likely be futile. If the wireless device is currently located in one of the identified geographic areas or zones, the slotted mode module 170 may bypass slotted mode operation or additional slotted wake-up cycles and proceed to system acquisition processing. In addition, other historical data related to previous system losses may be relied upon in determining whether to proceed with slotted mode operation or to bypass slotted mode operation and proceed with system acquisition processing.

Additionally, wireless communication device 120 has input mechanism 260 for generating inputs into communication device, and output mechanism 270 for generating information for consumption by the user of the communication device. For example, input mechanism 260 may include a mechanism such as a key or keyboard, a mouse, a touchscreen display, a microphone, etc. Further, for example, output mechanism 270 may include a display, an audio speaker, a haptic feedback mechanism, etc.

Figure 4:
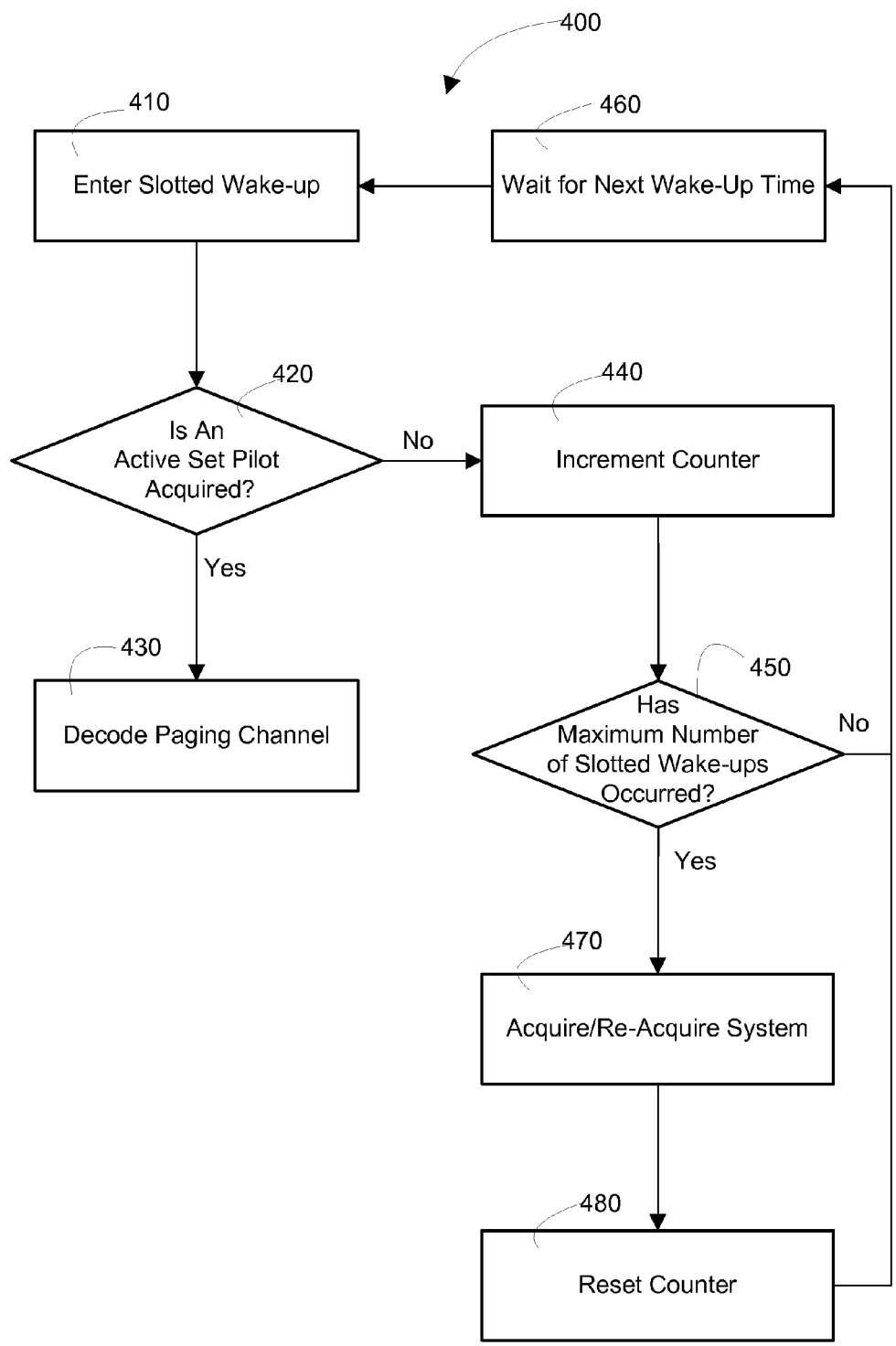
FIG. 4 is a flow diagram of a methodology for improved slotted mode operation in which a counter is used to track slotted wake-ups, according to an aspect.

Referring to FIG. 4, a flow diagram is depicted of the methodology 400 for improving slotted mode operation in a wireless communication device, according to aspects. In the illustrated aspect, a system loss is determined while the device is operating in slotted mode operation. As such, according to aspects, additional slotted wake-up cycles may be implemented in an attempt to acquire the active set pilot prior to attempting system, acquisition/re-acquisition. It should be noted that in other aspects, the network system loss may be determined during other operational modes, such as access mode, acquisition mode, idle-non-slotted mode, connection mode and the like. Additionally, in the illustrated aspect, a counter is used to determine whether the maximum allowable additional slotted wake-ups have been encountered prior to invoking the system acquisition module. At Event 410, the wireless communication, which is in the slotted mode of idle mode operation, enters a slotted wake-up period, otherwise referred to as a "slot". At Decision 420, a determination is made as to whether an active set pilot has been acquired during the slotted-wake-up. If an active set pilot is acquired during the slotted wake-up then, at Event 430, the wireless communication device decodes messages on the paging channel or conducts other actions associated with the slotted wake-up period.

If an active set pilot is unable to be acquired during the slotted wake-up, at Event 440, the counter is incremented by one to indicate the number of consecutive slotted wake-ups in which the active set pilot has not been acquired. At Decision 450, a determination is made as to whether the maximum number of slotted wake-ups has occurred. This determination is conducted by comparing the number indicated in the counter with a network system loss number of slotted wake-ups. If the maximum number of slotted wake-ups has yet to be equaled, at Event 460, the wireless communication device waits for the next wake-up period and at Event 410, once the wake-period ensues, enters into the next slotted wake-up.

If, as determined at Decision 450, the maximum number of slotted wake-ups has occurred then, at Event 470, the wireless device attempts to acquire a network system. As previously noted the device may re-acquire the same system that has just been lost or acquire a different system than the system lost. The system may be another cell or cell segment within a communication network or another network altogether. Once the attempt to acquire a system is completed, at Event 480, the counter is reset to indicate zero and the process returns to Event 460 and the wireless communication device waits for the next wake-up period.

Figure 5:
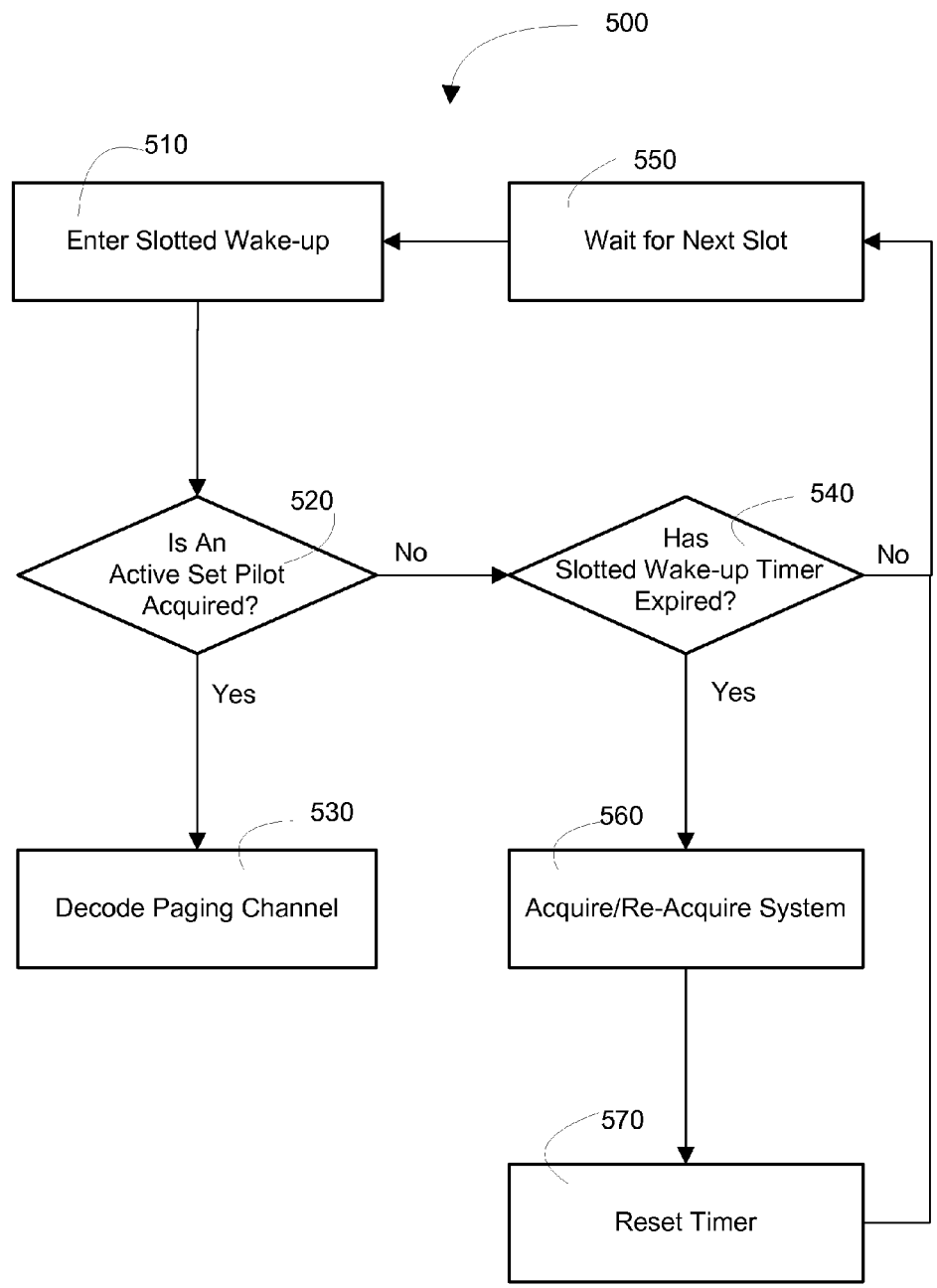
FIG. 5 is a flow diagram of a methodology for improved slotted mode operation in which a timer is used to track slotted wake-ups, according to another aspect.

Referring to FIG. 5, a flow diagram is depicted of the methodology 500 for improving slotted mode operation in a wireless communication device, according to aspects. In the illustrated aspect, a system loss is determined while the device is operating in slotted mode operation. As such, according to aspects, additional slotted wake-up cycles may be implemented in an attempt to acquire the active set pilot prior to attempting system, acquisition/re-acquisition. It should be noted that in other aspects, the network system loss may be determined during other operational modes, such as access mode, acquisition mode, idle-non-slotted mode, connection mode and the like. Additionally, in the illustrated aspect, a timer is used to determine whether the additional slotted wake-ups can be provided for prior to invoking the system acquisition module. At Event 510, the wireless communication, which is in the slotted mode of idle mode operation, enters a slotted wake-up period, otherwise referred to as a "slot". At Decision 520, a determination is made as to whether an active set pilot has been acquired during the slotted-wake-up. If an active set pilot is acquired during the slotted wake-up then, at Event 530, the wireless communication device decodes messages on the paging channel or conducts other actions associated with the slotted wake-up period.

If an active set pilot is unable to be acquired during the slotted wake-up, at Decision 540, a determination is made as to whether the slotted wake-up timer has expired. If the slotted-wake time has not expired, at Event 550, the wireless communication device waits for the next wake-up period and at Event 510, once the wake-period ensues, enters into the next slotted wake-up.

If, as determined at Decision 540, the slotted wake-up timer has expired then, at Event 560, the wireless device attempts to acquire a network system. As previously noted the device may re-acquire the same system that has just been lost or acquire a different system than the system lost. The system may be another cell or cell segment within a communication network or another network altogether. Once the attempt to acquire a system is completed, at Event 570, the timer is reset to and the process returns to Event 550 and the wireless communication device waits for the next wake-up period. It should be noted that the reset of the timer can occur at other stages in the flow, such as after waiting for the wake-up slot to occur or after completion of the initial slotted wake-up period.

Figure 6:
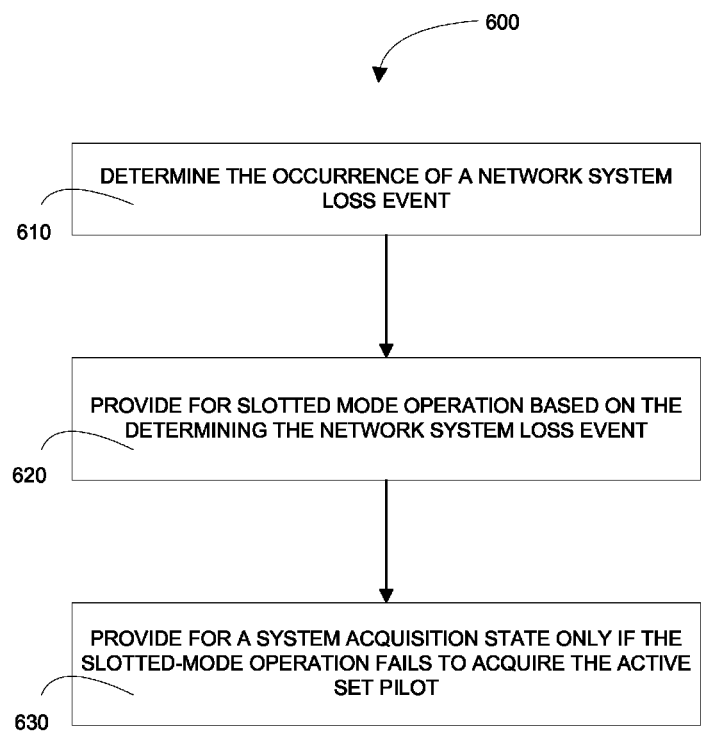
FIG. 6 is a flow diagram of a methodology for improved slotted mode operation, according to an aspect.

FIG. 6 is a flow diagram of a methodology 600 for improved slotted mode operation in a wireless communication device, according to an aspect. At Event 610, the occurrence of a network system loss event is determined. The network system loss event may occur during any operational mode, such as, but not limited to, slotted mode, idle-non-slotted mode, access mode, acquisition mode, connection mode or the like. At Event 620, slotted mode operation is provided based on the determination of the network system loss event. In the instance in which slotted mode operation is the mode during which the network system loss is determined, additional slotted mode wake-up cycles are provided based on the network system loss event. In one aspect of the method providing for the slotted mode operation may further include providing for a predetermined number of additional slotted mode wake-ups during which the active pilot set is attempted to be acquired. In another aspect providing for the slotted mode operation may further include providing for a predetermined time period for the additional slotted mode wake-ups during which the active pilot set is attempted to be acquired.

At Event 630, a system acquisition state is provided only if the allotted slotted mode operation fails to acquire the active set pilot. In certain aspects the system acquisition process may re-acquire the previous system and in other aspects a different system may be acquired.

Additionally, in alternate aspects one or more determinations may be accomplished prior to providing for the slotted mode operation. Such aspects may be beneficial in those instances in which it is determined that it is more beneficial to immediately re-acquire or acquire a system than it would be wait for re-acquiring or acquiring the system after an extended slot mode.

For example, one or more parameters related to current system signal strength may be determined prior to providing for the slotted mode operation. In such aspects, the method may include bypassing the slotted mode operation and providing for the system acquisition state after the system loss has been acknowledged, if the one or more parameters indicate a predetermined level of current signal strength. The predetermined level of signal strength may indicate that the signal strength is strong enough that any failure to acquire the active set pilot is not attributable to a fading signal condition or the signal strength may be weakened beyond a fade condition, such that repeated attempts at acquiring the active set pilot would be highly improbable of succeeding.

In another example, the method may include maintaining a history of system loss database and determining the history of system loss prior to providing for the slotted mode of operation. In such aspects, the method may further include bypassing the slotted mode operation and providing for the system acquisition state after the determination of a network system loss event, if the history of system loss indicates a need to acquire or re-acquire a system.

Figure 7:
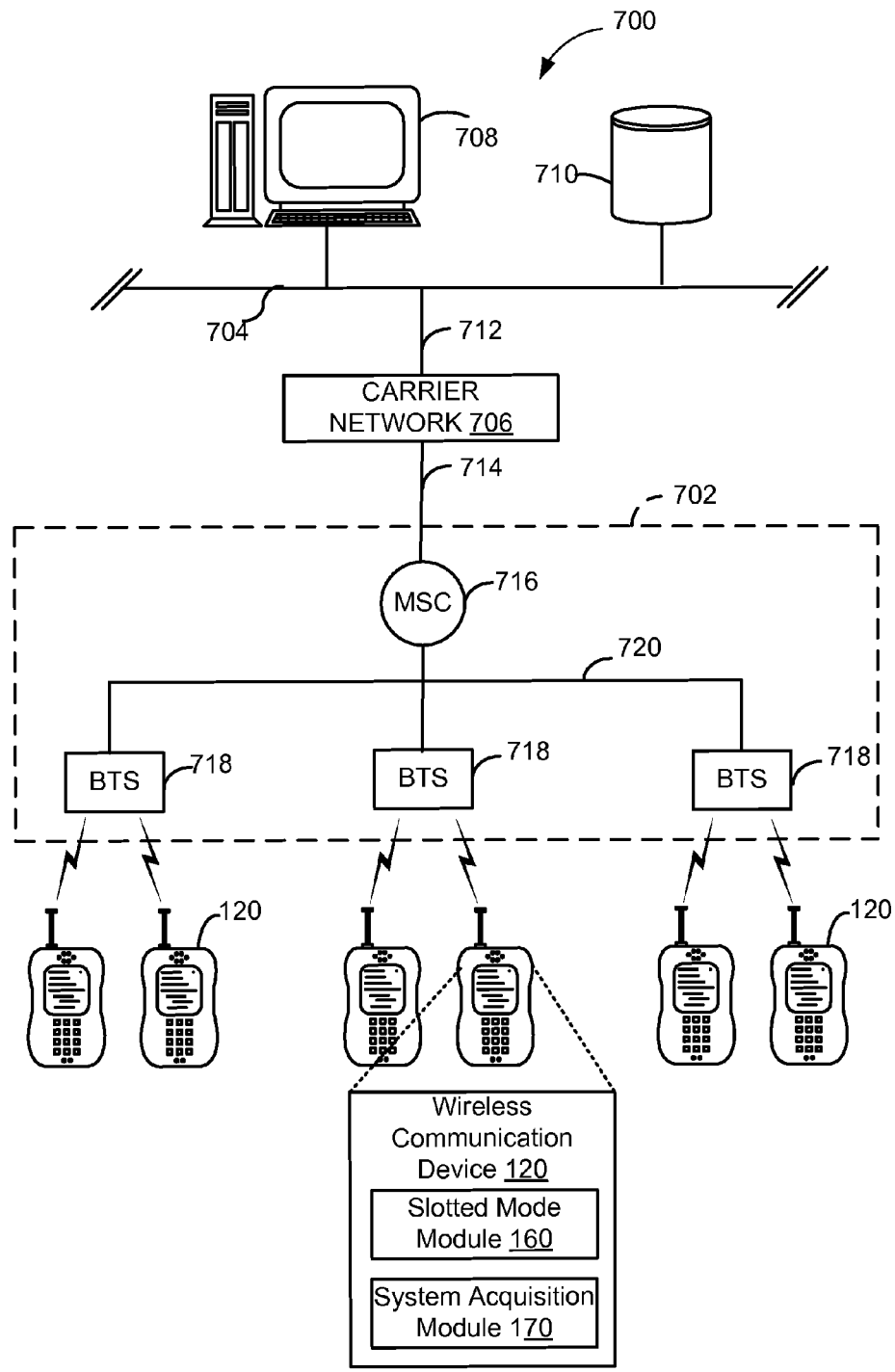
FIG. 7 is a block diagram of a cellular wireless system which may be used in conjunction with the wireless communication devices of present aspects.

FIG. 7 represents a block diagram of a cellular network 700, which may be used in conjunction with present aspects to communicate wireless messages. A wireless network 702 may be included within cellular network 700 and, as such may be implemented to communicate the call messages to the paging channel of wireless communication devices 120. Referring to FIG. 7, in one aspect, wireless communication device 120 may comprise a cellular telephone. In present aspects, wireless communication devices are configured to communicate via the cellular network 700. The cellular network 700 provides wireless communication device 120 the capability to communicate communication data packets, such as SMS data packets or other messaging data packets. The cellular telephone network 700 may include wireless network 702 connected to a wired network 704 via a carrier network 706. FIG. 7 is a representative diagram that more fully illustrates the components of a wireless communication network and the interrelation of the elements of one aspect of the present system. Cellular telephone network 700 is merely exemplary and can include any system whereby remote modules, such as wireless communication devices 120 communicate over-the-air between and among each other and/or between and among components of a wireless network 702, including, without limitation, wireless network carriers and/or servers.

In network 700, network device 708, such as a network server, can be in communication over a wired network 704 (e.g. a local area network, LAN). Further, a network database/storage device 710 may be in communication with network device 708 via the wired network 704. Network device 708 may receive and/or generate and communicate communication data packets, such as SMS message data packets to and from the wireless communication devices 120. Network device 708 and database 710 may be present on the cellular telephone network 700 with any other network components that are needed to provide cellular telecommunication services. Network device 708 and database 710 communicate with carrier network 706 through a data links 712 and 714, which may be data links such as the Internet, a secure LAN, WAN, or other network. Carrier network 706 controls messages (generally being data packets) sent to a mobile switching center ("MSC") 716. Further, carrier network 706 communicates with MSC 716 by a network 714, such as the Internet, and/or POTS ("plain old telephone service"). Typically, in network 714, a network or Internet portion transfers data, and the POTS portion transfers voice information. MSC 716 may be connected to multiple base stations ("BTS") 718 by another network 720, such as a data network and/or Internet portion for data transfer and a POTS portion for voice information. BTS 714 ultimately broadcasts messages wirelessly to the wireless communication devices 120, by short messaging service ("SMS"), or other over-the-air methods.

Figure 8:
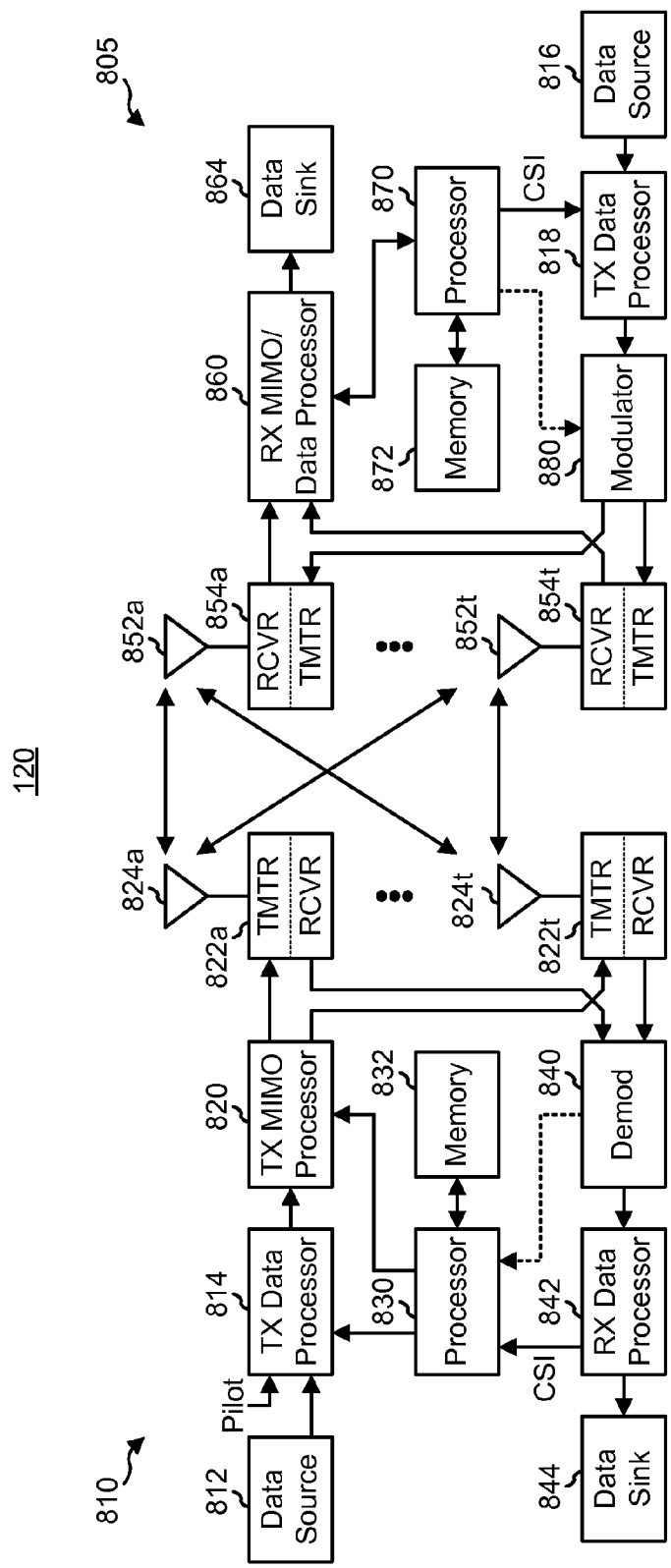
FIG. 8 is a block diagram depicting a transmitter and receiver in a multiple access wireless communication system, according to present aspects.

FIG. 8 illustrates a transmitter and receiver in a multiple access wireless communication system 800 according to various aspects presented herein. Wireless communication system 800 depicts one base station and one user device for sake of brevity. However, it is to be appreciated that the system can include more than one base station and/or more than one user device, wherein additional base stations and/or user devices can be substantially similar or different from the exemplary base station and user device described below. In addition, it is to be appreciated that the base station and/or the user device can employ the systems and/or methods described herein to facilitate wireless communication there between.

At transmitter system 810, traffic data for a number of data streams is provided from a data source 812, which includes the codebook of present aspects, to a transmit (TX) data processor 814. In some aspects, each data stream is transmitted over a respective transmit antenna. TX data processor 814 formats, codes, and interleaves the traffic data for each data stream based on a particular coding scheme selected for that data stream to provide coded data. In some aspects, TX data processor 814 applies beam-forming weights to the symbols of the data streams based upon the user to which the symbols are being transmitted and the antenna from which the symbol is being transmitted. In some aspects, the beam-forming weights may be generated based upon channel response information that is indicative of the condition of the transmission paths between the access network and the access terminal. The channel response information may be generated utilizing CQI (Channel Quality Indicator) information or channel estimates provided by the user. Further, in those cases of scheduled transmissions, the TX data processor 814 can select the packet format based upon rank information that is transmitted from the user.

The coded data for each data stream may be multiplexed with pilot data using OFDM (Orthogonal Frequency Division Multiplexing) techniques. The pilot data is typically a known data pattern that is processed in a known manner and may be used at the receiver system to estimate the channel response. The multiplexed pilot and coded data for each data stream is then modulated (e.g., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed or provided by processor 830. In some aspects, the number of parallel spatial streams may be varied according to the rank information that is transmitted from the user.

The modulation symbols for the data streams are provided to a TX MIMO processor 820, which may further process the modulation symbols (e.g., for OFDM). TX MIMO processor 820 provides NT symbol streams to NT transmitters (TMTR) 822*a* through 822*t*. In some aspects, TX MIMO processor 820 applies beam-forming weights to the symbols of the data streams based upon the user to which the symbols are being transmitted and the antenna from which the symbol is being transmitted from that users channel response information.

Each transmitter 822 receives and processes a respective symbol stream to provide one or more analog signals, and further conditions (e.g., amplifies, filters, and upconverts) the analog signals to provide a modulated signal suitable for transmission over the MIMO channel. NT modulated signals from transmitters 822*a* through 822*t* are transmitted from NT antennas 824*a* through 824*t*, respectively.

At receiver system 850, the transmitted modulated signals are received by NR antennas 852*a* through 852*t* and the received signal from each antenna 852 is provided to a respective receiver (RCVR) 854. Each receiver 854 conditions (e.g., filters, amplifies, and downconverts) a respective received signal, digitizes the conditioned signal to provide samples, and further processes the samples to provide a corresponding "received" symbol stream.

An RX data processor 860 then receives and processes the NR received symbol streams from NR receivers 854 based on a particular receiver processing technique to provide the rank number of "detected" symbol streams. The processing by RX data processor 860 is described in further detail below. Each detected symbol stream includes symbols that are estimates of the modulation symbols transmitted for the corresponding data stream. RX data processor 860 then demodulates, deinterleaves, and decodes each detected symbol stream to recover the traffic data for the data stream. The processing by RX data processor 860 is complementary to that performed by TX MIMO processor 1320 and TX data processor 814 at transmitter system 810.

The channel response estimate generated by RX processor 860 may be used to perform space, space/time processing at the receiver, adjust power levels, change modulation rates or schemes, or other actions. RX processor 860 may further estimate the signal-to-noise-and-interference ratios (SNRs) of the detected symbol streams, and possibly other channel characteristics, and provides these quantities to a processor 870. RX data processor 860 or processor 870 may further derive an estimate of the "effective" SNR for the system. Processor 1370 then provides estimated channel information (CSI), which may comprise various types of information regarding the communication link and/or the received data stream. For example, the CSI may comprise only the operating SNR. The CSI is then processed by a TX data processor 818, which also receives traffic data for a number of data streams from a data source 816, modulated by a modulator 880, conditioned by transmitters 854*a* through 854*t*, and transmitted back to transmitter system 810.

At transmitter system 810, the modulated signals from receiver system 850 are received by antennas 824, conditioned by receivers 822, demodulated by a demodulator 840, and processed by a RX data processor 842 to recover the CSI reported by the receiver system. The reported CSI is then provided to processor 830 and used to (1) determine the data rates and coding and modulation schemes to be used for the data streams and (2) generate various controls for TX data processor 814 and TX MIMO processor 820.

At the receiver, various processing techniques may be used to process the NR received signals to detect the NT transmitted symbol streams. These receiver processing techniques may be grouped into two primary categories (i) spatial and space-time receiver processing techniques (which are also referred to as equalization techniques); and (ii) "successive nulling/equalization and interference cancellation" receiver processing technique (which is also referred to as "successive interference cancellation" or "successive cancellation" receiver processing technique).

A MIMO channel formed by the NT transmit and NR receive antennas may be decomposed into $N_S$ independent channels, with $N_S \leq \min\{N_T, N_R\}$. Each of the $N_S$ independent channels may also be referred to as a spatial subchannel (or a transmission channel) of the MIMO channel and corresponds to a dimension.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Thus, aspects are provided for systems, methods, devices and computer program products that allow for wireless communication devices to operate more robustly in the slot mode of operation. Specifically, present aspects require the wireless device to move to or remain in the slotted mode for an extended period under fading channel conditions as opposed to immediately entering into a system determination/acquisition mode upon determining a network system loss event. By moving to or remaining in the slotted mode for an extended period, present aspects provide for performing slotted wake-up cycles or additional cycles after acknowledgement of a network system loss event and prior to declaring the system as being lost and acquiring the same or a different system/cell. The slotted mode operation allows for attempts at acquiring the active set pilot before declaring the system as lost, thereby allowing for fading channel conditions to prevail without the need to re-acquire the lost system or otherwise acquire another system. Since the performance of slotted mode operation is less power intensive than acquiring or re-acquiring a system, a substantial power savings is realized.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method for initiating slotted mode operation in a wireless communication device, comprising:
   determining an occurrence of a network system loss event;
   providing for slotted mode operation upon determining the network system loss event, wherein the slotted mode operation is an operation during which the wireless communication device periodically wakes to receive any paging signals and attempts to acquire an active set pilot from the network system during an initial slotted mode wake-up and one or more additional slotted mode wake-ups;

providing for a system acquisition state only if the slotted mode operation fails to acquire the active set pilot from the network system; and bypassing the slotted mode operation and providing for the system acquisition state after determining the network system loss event if a condition is met.

2. The method of claim 1, wherein determining the occurrence of the network system loss event further comprises determining the failure to acquire the active pilot set during the initial slotted mode wake-up.

3. The method of claim 2, wherein providing for slotted mode operation further comprises providing for the one or more additional slotted mode wake-ups, wherein each additional slotted mode wake-up attempts to acquire the active set pilot of the network system.

4. The method of claim 2, wherein providing for a system acquisition state further comprises providing for a system acquisition state only if the one or more additional slotted mode wake-ups fail to acquire the active set pilot.

5. The method of claim 1, wherein determining the occurrence of the network system loss event further defines the network system loss event as an access state network system loss event.

6. The method of claim 1, wherein determining the occurrence of the network system loss event further defines the network system loss event as a connected state network system loss event.

7. The method of claim 1, wherein determining the occurrence of the network system loss event further defines the network system loss event as an acquisition state network system loss event.

8. The method of claim 1, wherein determining the occurrence of the network system loss event further defines the network system loss event as an idle-none-slotted state network system loss event.

9. The method of claim 1, wherein providing for slotted mode operation further comprises providing for a predetermined number of slotted mode wake-ups, wherein each additional slotted mode wake-up attempts to acquire the active set pilot of the network system.

10. The method of claim 1, wherein providing for slotted mode operation further comprises providing for a predetermined time period for the slotted mode operation during which the active pilot set is attempted to be acquired.

11. The method of claim 1, further comprising determining one or more parameters related to current system signal strength prior to providing for slotted mode operation.

12. The method of claim 11, further comprising bypassing the slotted mode operation and providing for the system acquisition state after determining the network system loss event if the one or more parameters indicate a network system loss level of current signal strength.

13. The method of claim 1, further comprising maintaining a history of system loss database and determining the history of system loss prior to providing the one or more additional slotted mode wake-ups.

14. The method of claim 13, further comprising bypassing the slotted mode operation and providing for the system acquisition state after determining the network system loss event if the history of system loss indicates a need to acquire a system.

15. The method of claim 1, wherein providing for a system acquisition state further comprises providing for a system acquisition state that includes either attempting to re-acquire a current system or attempting to acquire a new system different from the current system.

16. The method of claim 1, wherein the condition comprises at least one of a first indication of a network system loss level of current signal strength and a second indication of a need to acquire a system.

17. At least one processor configured to provide for slotted mode operation of a wireless communication device, comprising at least one hardware module for:

determining an occurrence of a network system loss event;

providing for slotted mode operation upon determining the network system loss event, wherein the slotted mode operation is an operation during which the wireless communication device periodically wakes to receive any paging signals and attempts to acquire an active set pilot from the network system during an initial slotted mode wake-up and one or more additional slotted mode wake-ups;

providing for a system acquisition state only if the slotted mode operation fails to acquire the active set pilot from the network system; and bypassing the slotted mode operation and providing for the system acquisition state after determining the network system loss event if a condition is met.

18. A computer program product, comprising:

a non-transitory computer-readable medium comprising:

a first set of codes for causing a computer to determine an occurrence of a network system loss event;

a second set of codes for causing the computer to provide for slotted mode operation upon determining the network system loss event, wherein the slotted mode operation is an operation during which the wireless communication device periodically wakes to receive any paging signals and attempts to acquire an active set pilot from the network system during an initial slotted mode wake-up and one or more additional slotted mode wake-ups;

a third set of codes for causing the computer to provide for a system acquisition state only if the slotted mode operation fails to acquire the active set pilot from the network system; and a fourth set of codes for causing the computer to bypass the slotted mode operation and providing for the system acquisition state after determining the network system loss event if a condition is met.

19. An apparatus, comprising:

means for determining an occurrence of a network system loss event;

means for providing for slotted mode operation upon determining the network system loss event, wherein the slotted mode operation is an operation during which the wireless communication device periodically wakes to receive any paging signals and attempts to acquire an active set pilot from the network system during an initial slotted mode wake-up and one or more additional slotted mode wake-ups;

means for providing for a system acquisition state only if the slotted mode operation fails to acquire the active set pilot from the network system; and means for bypassing the slotted mode operation and providing for the system acquisition state after determining the network system loss event if a condition is met.

20. A wireless communication device, comprising:

a computer platform including a processor and a memory in communication with the processor;

a slotted mode module stored in the memory and in communication with the processor, wherein the slotted mode module is configured to provide for slotted mode operation based on an occurrence of a network system loss event, wherein the slotted mode operation is an operation during which the wireless communication device periodically wakes to receive any paging signals and attempts to acquire an active set pilot from the network system during an initial slotted mode wake-up and one or more additional slotted mode wake-ups;

a system acquisition module stored in the memory and in communication with the processor, wherein the system acquisition module is configured to attempt to acquire the network system only if the slotted mode operation fails to acquire the active set pilot from the network system; and wherein the slotted mode module is further configured to bypass the additional slotted mode wake-ups, and the system acquisition module is further configured to attempt to acquire a system after the initial slotted mode wake up fails to acquire the active set pilot, if a condition is met.

21. The wireless communication device of claim 20, wherein the slotted mode module is further configured to determine the failure to acquire the active pilot set during the initial slotted mode wake-up.

22. The wireless communication device of claim 21, wherein the slotted mode module is further configured to provide for the one or more additional slotted mode wake-ups, wherein each additional slotted mode wake-up attempts to acquire the active set pilot of the network system.

23. The wireless communication device of claim 20, wherein the slotted mode module is further configured to provide for the system acquisition state only if the one or more additional slotted mode wake-ups fail to acquire the active set pilot.

24. The wireless communication device of claim 20, wherein the slotted mode module is further configured to provide for slotted mode operation based on an occurrence of an access state network system loss event.

25. The wireless communication device of claim 20, wherein the slotted mode module is further configured to provide for slotted mode operation based on an occurrence of a connected state network system loss event.

26. The wireless communication device of claim 20, wherein the slotted mode module is further configured to provide for slotted mode operation based on an occurrence of an acquisition state network system loss event.

27. The wireless communication device of claim 20, wherein the slotted mode module is further configured to provide for slotted mode operation based on an occurrence of an idle-non-slotted state network system loss event.

28. The wireless communication device of claim 20, wherein the slotted mode module is further configured to provide for a predetermined number of slotted mode wake-ups based on the occurrence of the network system loss event, wherein each additional slotted mode wake-up attempts to acquire the active set pilot of the network system.

29. The wireless communication device of claim 20, wherein the slotted mode module is further configured to provide for a predetermined time period for the slotted mode operation during which the active pilot set is attempted to be acquired.

30. The wireless communication device of claim 20, further comprising a signal strength monitoring module stored in the memory and in communication with the processor, wherein the module is configured to monitor current signal strength.

31. The wireless communication device of claim 30, wherein the slotted mode module is further configured to bypass the additional slotted mode wake-ups and the system acquisition module is further configured to attempt to acquire a system after the initial slotted mode wake up fails to acquire the active set pilot, if the one or more monitoring of the current signal strength indicate an acceptable level of current signal strength.

32. The wireless communication device of claim 20, further comprising a history of system loss database stored in the memory and in communication with the processor, wherein the database is configured to store parameters related to system loss.

33. The wireless communication device of claim 32, wherein the slotted mode module is further configured to bypass the additional slotted mode wake-ups and the system acquisition module is configured to attempt to acquire the system after the initial slotted mode wake up fails to acquire the active set pilot, if the history of system loss indicates a need to acquire a system.

34. The wireless communication device of claim 20, wherein the system acquisition module is further configured to attempt to acquire a system, wherein the system comprises either a current system or a new system different from the current system.

35. The wireless communication device of claim 20, wherein the condition comprises at least one of a first indication of a network system loss level of current signal strength and a second indication of a need to acquire a system.

* * * * *